United States Patent
Chen et al.

(10) Patent No.: US 10,816,400 B2
(45) Date of Patent: Oct. 27, 2020

(54) SPECTROMETER, OPTOMECHANICAL MODULE, AND OPERATION METHOD FOR SPECTROMETER

(71) Applicant: InnoSpectra Corporation, Hsinchu County (TW)

(72) Inventors: Cheng-Hsiung Chen, Hsinchu County (TW); Yung-Yu Huang, Hsinchu County (TW); Ming-Hui Lin, Hsinchu County (TW); He-Yi Hsieh, Hsinchu County (TW); Hsi-Pin Li, Hsinchu County (TW)

(73) Assignee: InnoSpectra Corporation, Hsin-Chu (TW)

( * ) Notice: Subject to any disclaimer, the term of this patent is extended or adjusted under 35 U.S.C. 154(b) by 0 days.

(21) Appl. No.: 16/423,161

(22) Filed: May 28, 2019

(65) Prior Publication Data
US 2019/0368928 A1   Dec. 5, 2019

(30) Foreign Application Priority Data
Jun. 1, 2018   (CN) ............... 2018 1 0557880

(51) Int. Cl.
  *G01J 3/28*   (2006.01)
  *G01J 3/02*   (2006.01)
  (Continued)

(52) U.S. Cl.
  CPC ........... *G01J 3/0297* (2013.01); *G01J 3/0202* (2013.01); *G01J 3/027* (2013.01); *G06F 3/0604* (2013.01);
  (Continued)

(58) Field of Classification Search
  CPC .... G01J 3/02; G01J 3/28; G01J 3/2803; G01J 3/10; G01J 3/2823
  (Continued)

(56) References Cited

U.S. PATENT DOCUMENTS 9,927,458 B2 *   3/2018  Bramhavar ........... G01P 15/097
2005/0017313 A1 *   1/2005  Wan .................... B81C 1/00285
                                                257/415
(Continued)

FOREIGN PATENT DOCUMENTS

TW      I439683       6/2014
TW      201721112     6/2017

*Primary Examiner* — Md M Rahman
(74) *Attorney, Agent, or Firm* — JCIPRNET

(57) ABSTRACT

A spectrometer including an optomechanical module and a control module is provided. The optomechanical module includes an optomechanical engine and a sampling device. The optomechanical engine and the sampling device are disposed in the optomechanical module. The sampling device is coupled to the optomechanical engine. The sampling device is configured to transfer a sampling light to the optomechanical engine. The sampling device includes a memory device. The memory device is disposed in the sampling device. The memory device is configured to pre-store an optomechanical parameter corresponding to the optomechanical engine. The control module is coupled to the optomechanical module. The control module is configured to read the memory device to obtain the optomechanical parameter. The control module calibrates the optomechanical engine according to the optomechanical parameter.

20 Claims, 3 Drawing Sheets

(51) Int. Cl.
*G06F 13/16* (2006.01)
*G06F 3/06* (2006.01)

(52) U.S. Cl.
CPC .......... *G06F 3/0659* (2013.01); *G06F 3/0673* (2013.01); *G06F 13/1668* (2013.01)

(58) Field of Classification Search
USPC ........................................................ 356/326
See application file for complete search history.

(56) References Cited

U.S. PATENT DOCUMENTS

2017/0153142 A1    6/2017  Rosen et al.
2018/0059039 A1*   3/2018  Li ........................... G01N 24/10
2018/0188183 A1*   7/2018  Feng ................ C12Q 2565/601

* cited by examiner

SPECTROMETER, OPTOMECHANICAL MODULE, AND OPERATION METHOD FOR SPECTROMETER

CROSS-REFERENCE TO RELATED APPLICATION

This application claims the priority benefit of China application serial no. 201810557880.0, filed on Jun. 1, 2018. The entirety of the above-mentioned patent application is hereby incorporated by reference herein and made a part of this specification.

BACKGROUND OF THE INVENTION

1. Field of the Invention

The present invention relates to optical equipment, in particular, to a spectrometer, an optomechanical module, and an operation method for a spectrometer.

2. Description of Related Art

A spectrometer is widely used in material analysis application. Due to the assembly tolerance of the spectrometer, the spectrometer must calibrate an optomechanical module in order to ensure the wavelength accuracy measured by the spectrometer. Moreover, after calibration, the spectrometer may further make the measured spectral signal intensity correspond to a calibrated wavelength position according to a wavelength calibration parameter. In general, an optomechanical parameter for calibration is stored in a memory of a control module of the spectrometer. In other words, a specific optomechanical module must cooperate with a corresponding control module, so that the spectrometer can effectively calibrate the optomechanical module.

During the assembling of a spectrometer, a manufacturer must measure an optomechanical module to obtain a corresponding optomechanical parameter, and write the corresponding optomechanical parameter into a memory of a corresponding control module. However, if the corresponding control module is damaged or lost, even if other control modules are used to be assembled with the optomechanical module, the optomechanical module cannot be accurately calibrated since corresponding optomechanical parameters are not stored in the other control modules. In view of this, in order to effectively reduce the manufacturing cost and the maintenance cost and to make the optomechanical module be effectively and accurately calibrated to provide a good material analysis application function from the spectrometer, several solutions will be proposed below.

The information disclosed in this Background section is only for enhancement of understanding of the background of the described technology and therefore it may contain information that does not form the prior art that is already known to those skilled in the art. Further, the information disclosed in the Background section does not mean that one or more problems to be resolved by one or more embodiments of the present invention were acknowledged by those skilled in the art.

SUMMARY OF THE INVENTION

The present invention provides a spectrometer, an optomechanical module, and an operation method for a spectrometer, in which a control module reads an optomechanical parameter provided by a memory device disposed in a sampling device of an optomechanical module and thus the control module can effectively calibrate an optomechanical engine.

Other objectives and advantages of the present invention may be further understood from the technical features disclosed in the present invention.

In order to achieve one, some, or all of the aforementioned objectives or other objectives, an embodiment of the present invention provides a spectrometer including an optomechanical module and a control module. The optomechanical module includes an optomechanical engine and a sampling device. The optomechanical engine is disposed in the optomechanical module. The sampling device is disposed in the optomechanical module and coupled to the optomechanical engine. The sampling device is configured to transfer a sampling light to the optomechanical engine. The sampling device includes a memory device. The memory device is disposed in the sampling device. The memory device is configured to pre-store an optomechanical parameter corresponding to the optomechanical engine. The control module is coupled to the optomechanical module. The control module is configured to read the memory device to obtain the optomechanical parameter. The control module calibrates the optomechanical engine according to the optomechanical parameter.

In order to achieve one, some, or all of the aforementioned objectives or other objectives, an embodiment of the present invention provides an optomechanical module including an optomechanical engine and a sampling device. The optomechanical engine is disposed in the optomechanical module. The sampling device is disposed in the optomechanical module and coupled to the optomechanical engine. The sampling device is configured to transfer a sampling light to the optomechanical engine. The sampling device includes a memory device. The memory device is disposed in the sampling device. The memory device is configured to pre-store an optomechanical parameter corresponding to the optomechanical engine. The memory device includes a memory and a control interface. The control interface is coupled to the memory. The memory device communicates with an external control module in a wired or wireless manner through the control interface to provide the optomechanical parameter to the control module, such that the control module calibrates the optomechanical engine according to the optomechanical parameter.

In order to achieve one, some, or all of the aforementioned objectives or other objectives, an embodiment of the present invention provides an operation method for a spectrometer, which is applied to a spectrometer. The spectrometer includes an optomechanical module and a control module. The optomechanical module includes an optomechanical engine and a sampling device. The sampling device includes a memory device. The operation method for a spectrometer includes the following steps: pre-storing an optomechanical parameter corresponding to the optomechanical engine in the memory device in the sampling device; reading the memory device by the control module to obtain the optomechanical parameter; and calibrating the optomechanical engine by the control module according to the optomechanical parameter.

Based on the foregoing, the embodiments of the present invention have at least one of the following advantages or effects. According to the spectrometer, the optomechanical module and the operation method for a spectrometer in the present invention, an optomechanical parameter corresponding to an optomechanical engine and a sampling device parameter corresponding to a sampling device may be provided for a control module by means of a memory device disposed in an optomechanical module, such that the control module can effectively and accurately calibrate the optomechanical module. In other words, since the memory device is configured to record the optomechanical parameter and the sampling device parameter is disposed in the sampling device, the optomechanical engine of the spectrometer in the present invention does not need to be assembled with a specific control module. The control module of the spectrometer may obtain an appropriate optomechanical parameter and a sampling device parameter by reading the memory device disposed in the sampling device.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
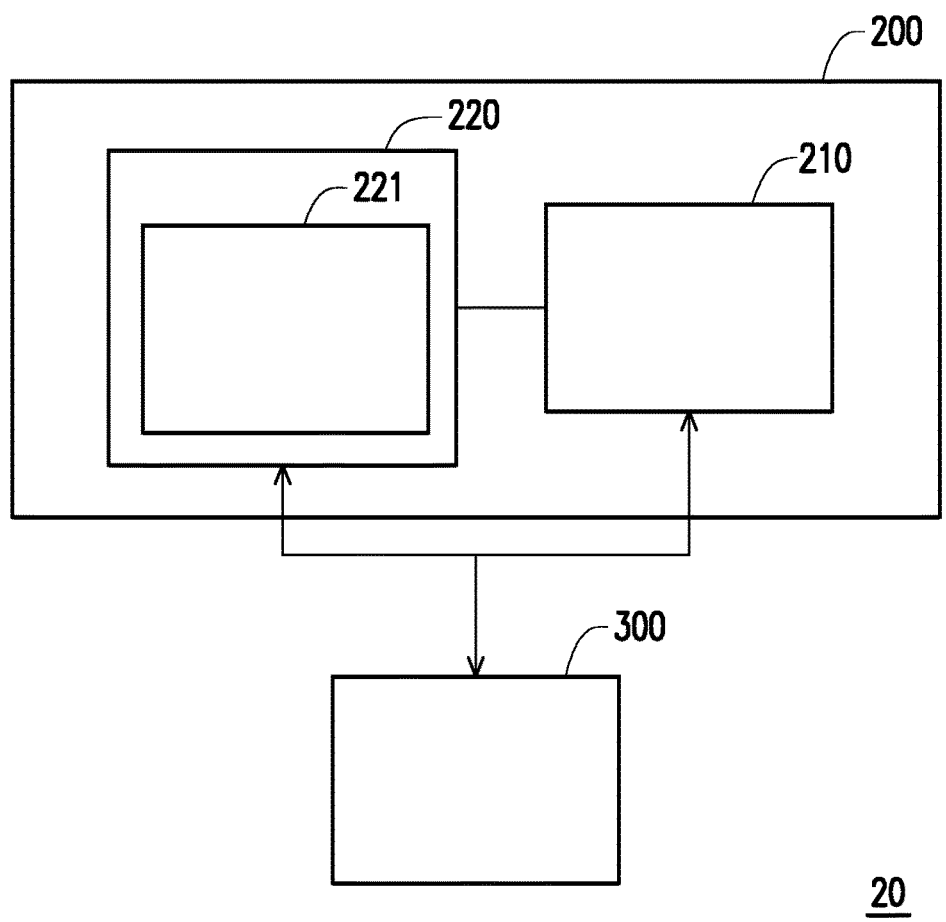
FIG. 1 is a schematic view of a spectrometer according to an embodiment of the present invention.

FIG. 1 is a schematic view of a spectrometer according to an embodiment of the present invention. Referring to FIG. 1, a spectrometer 20 includes an optomechanical module 200 and a control module 300. The control module 300 is coupled to the optomechanical module 200. The optomechanical module 200 includes an optomechanical engine 210 and a sampling device 220. The optomechanical engine 210 and the sampling device 220 are disposed in the optomechanical module, and the sampling device 220 is coupled to the optomechanical engine 210. The sampling device 220 is configured to transfer a sampling light to the optomechanical engine 210. In the present embodiment, the sampling device 220 includes a memory device 221. The memory device 221 is disposed in the sampling device 220. The memory device 221 is configured to pre-store an optomechanical parameter corresponding to the optomechanical engine 210. For example, the sampling device 220 may include a circuit board, and the memory device 221 and functional circuits such as a control circuit and a sensing circuit are disposed on the circuit board. The control module 300 may obtain an optomechanical parameter and a sampling device parameter by reading the memory device 221 disposed on the circuit board of the sampling device 220, and respectively output a calibration signal or a control signal to the optomechanical engine 210 and the sampling device 220 according to the optomechanical parameter and the sampling device parameter to effectively calibrate the optomechanical engine 210 and the sampling device 220.

The optomechanical engine 210 may be used to provide power for the sampling device 220, and a control signal may be transmitted and received between the optomechanical engine 210 and the sampling device 220. In the present embodiment, the optomechanical engine 210 may, for example, include an optomechanical component such as a light receiving element, a light splitting element, a wavelength selector, an optical sensor, a lens group and a mechanical component, but the present invention is not limited to this. In the present embodiment, the sampling device 220 may include at least one of a transmissive sampling device, a reflective sampling device, an optical fiber input sampling device and other types of sampling devices, which is not limited in the present invention. Other related optical elements, mechanical elements and functional circuits of the optomechanical engine 210 and the sampling device 220 may be provided with sufficient instructions, suggestions and implementation illustrations according to common knowledge in the art. The descriptions thereof are omitted herein.

It should be noted that in order to ensure the wavelength accuracy of the spectrometer, wavelength calibration must be performed on the optomechanical module 200 during the manufacturing process. Due to the assembly tolerance of parts of the optomechanical engine 210, different optomechanical engines 210 will generate a group of specific optomechanical parameters after wavelength calibration. The optomechanical parameters may, for example, include at least one of a wavelength calibration parameter, an effective wavelength range parameter, an optomechanical control parameter, an optomechanical serial number parameter and an optomechanical operation time parameter. However, since different optomechanical engines 210 have different tolerances, the wavelength calibration parameter will be changed accordingly, and cannot be compensated with a fixed optomechanical parameter. Therefore, the optomechanical module 200 of the present embodiment directly disposes the memory device 221 in the circuit board of the sampling device 220.

Figure 2:
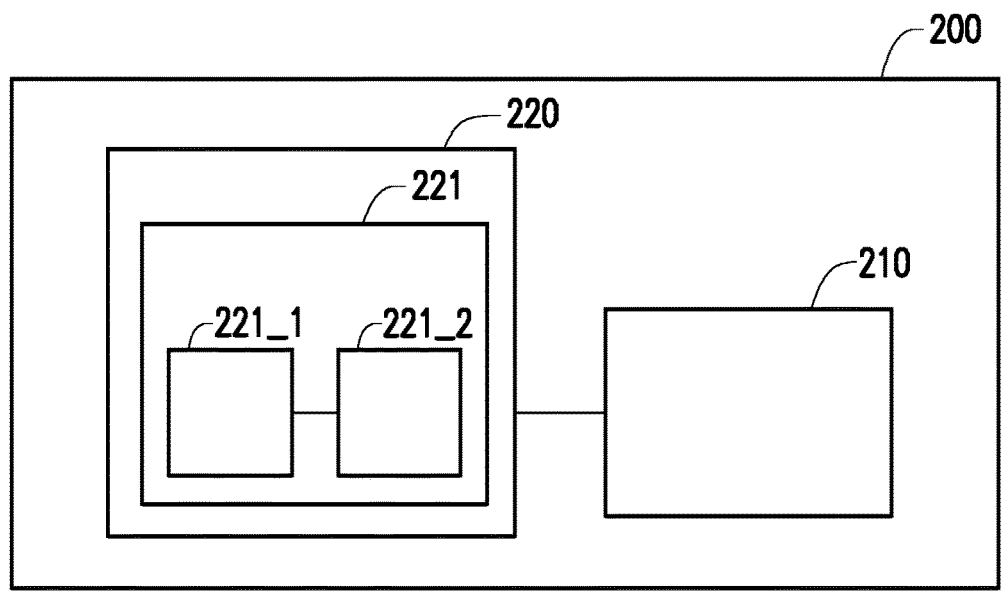
FIG. 2 is a schematic view of an optomechanical module according to an embodiment of the present invention.

FIG. 2 is a schematic view of an optomechanical module according to an embodiment of the present invention. Referring to FIG. 2, in the present embodiment, the memory device 221 includes a memory 221_1 and a control interface 221_2, and the control interface 221_2 is coupled to the memory 221_1. In particular, the memory 221_1 may be configured to record an optomechanical parameter. The optomechanical parameter may pre-store a corresponding related calibration parameter in the memory 221_1 of the sampling device 220 in the manufacturing process of the optomechanical module 200 according to the characteristics of the optomechanical engine 210. When the sampling device 220 is combined with the external control module 300, the control module 300 may communicate with the control interface 221_2 in a wired or wireless manner. The control module 300 may read the optomechanical parameter stored in the memory 221_1 and then output a corresponding calibration signal or control signal to a control circuit and a sensing circuit according to the optomechanical parameter provided by the memory 221_1 of the sampling device 220, so as to calibrate, for example, related settings of a light source, an optical sensor and the like of the optomechanical engine 210.

In other words, the optomechanical module 200 of the present embodiment may store the optomechanical parameter by means of the memory 221_1 disposed in the sampling device 220. The control module 300 may effectively calibrate the optomechanical engine 210 of the optomechanical module 200 by reading the optomechanical parameter of the memory 221_1 disposed in the sampling device 220. Moreover, the optomechanical module 200 of the present embodiment may effectively avoid incompatibility between the optomechanical parameter manually input by a user and the optomechanical engine 210.

In addition, in an embodiment, the memory device 221 may also pre-store a sampling device parameter corresponding to the sampling device 220. The sampling device parameter may include at least one of a sampling device type, a sampling device serial number, a light source operation time parameter, a signal processing parameter, a sampling device control parameter and a sampling device calibration parameter. When the sampling device 220 is combined with the external control module 300, the control module 300 may communicate with the control interface 221_2 in a wired or wireless manner to read the sampling device parameter stored in the memory 221_1, and to calibrate the sampling device 220 according to the sampling device parameter. In other words, in this embodiment, the optomechanical module 200 may also store the sampling device parameter by means of the memory 221_1 in the sampling device 220, and the sampling device parameter may pre-store a corresponding related calibration parameter in the memory 221_1 of the sampling device 220 in the manufacturing process of the optomechanical module 200 according to the characteristics of the sampling device 220. Similar to the aforementioned embodiment, the optomechanical module 200 effectively avoids incompatibility between the sampling device parameter manually input by a user and the sampling device 220.

In the present embodiment, the memory 221_1 may be a flash memory, an electrically-erasable programmable read-only memory (EEPROM) or a ferroelectric random access memory (FRAM), and the present invention is not limited to this. In the present embodiment, the control interface 221_2 may be an inter-integrated circuit (I2C) bus-bar, a serial peripheral interface (SPI) bus-bar, a near field communication (NFC) interface or a radio frequency identification (RFID) interface, and the present invention is not limited to this.

Figure 3:
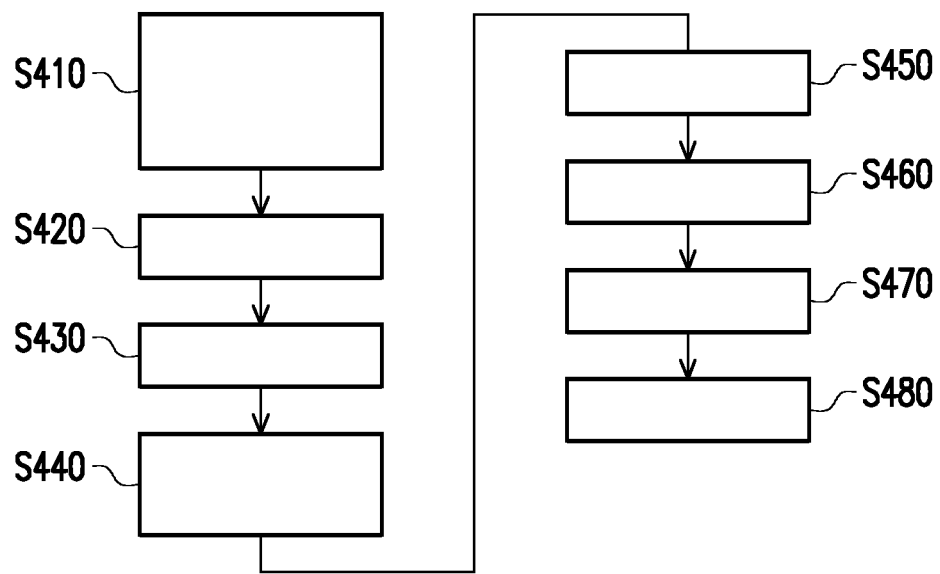
FIG. 3 is a flowchart of an operation method for a spectrometer according to an embodiment of the present invention.

FIG. 3 is a flowchart of an operation method for a spectrometer according to an embodiment of the present invention. Referring to FIG. 1, FIG. 2 and FIG. 3, an operation method of the present embodiment may be at least applied to the spectrometer 20 in FIG. 1. In the present embodiment, the optomechanical module 200 and the control module 300 are assembled into the spectrometer 20, wherein the optomechanical parameter and the sampling device parameter may pre-store corresponding related calibration parameters in the memory 221_1 of the sampling device 220 in the manufacturing process of the optomechanical module 200 according to the characteristics of the sampling device 220. When a user uses the spectrometer 20 to perform spectral measurement operation on a measured object. In step S410, the control module 300 may read the memory device 221 disposed in the sampling device 220 of the optomechanical module 200 to obtain the optomechanical parameter and the sampling device parameter. In step S420, the control module 300 sets an optomechanical control parameter of the optomechanical engine 210 according to the optomechanical parameter read from the memory device 221, but the present invention is not limited to this. In an embodiment, the control module 300 sets at least one of a wavelength calibration parameter, an effective wavelength range parameter, an optomechanical control parameter, an optomechanical serial number parameter and an optomechanical operation time parameter of the optomechanical engine 210 according to the optomechanical parameter read from the memory device 221. In step S430, the control module 300 sets the sampling device control parameter of the sampling device 220 according to the sampling device parameter read from the memory device 221, but the present invention is not limited to this. In an embodiment, the control module 300 sets at least one of a sampling device type, a sampling device serial number, a light source operation time parameter, a signal processing parameter, a sampling device control parameter and a sampling device calibration parameter of the sampling device 220 according to the sampling device parameter read from the memory device 221. In step S440, the control module 300 sets a spectral signal processing parameter. The control module 300 may determine to analyze the spectral signal processing parameter according to the characteristics of the optomechanical engine 210 and the type of the sampling device 220.

In the present embodiment, after the spectrometer 20 completes settings of steps S410 to S440, the spectrometer 20 may start to measure a measured object. In step S450, the control module 300 controls the optomechanical engine 210 and the sampling device 220 to measure the measured object, so as to obtain a spectral signal of the measured object. In step S460, the control module 300 executes spectral signal processing on the spectral signal, so as to analyze the spectral signal according to the spectral signal processing parameter and to output a sensing result. In step S470, the control module 300 may obtain a more appropriate optomechanical parameter according to an operation result of the optomechanical module 300, so as to update the optomechanical parameter. In step S480, the control module 300 writes a new optomechanical parameter and the sampling device parameter into the memory device 221, and ends the spectral measurement operation. That is to say, the control module 300 may write or correspondingly modify the optomechanical parameter pre-stored in the memory device 221 according to the operation result of the optomechanical module 300, but the present invention is not limited to this. In an embodiment, the control module 300 may also write or correspondingly modify the sampling device parameter pre-stored in the memory device 221 according to the operation result of the optomechanical module 300. Therefore, the operation method of the present embodiment may effectively obtain the spectral signal of the measured object, and may judge whether the optomechanical parameter is appropriate according to the sensing result, so as to manually update the optomechanical parameter by a user, or automatically update the optomechanical parameter by the control module 300.

Figure 4:
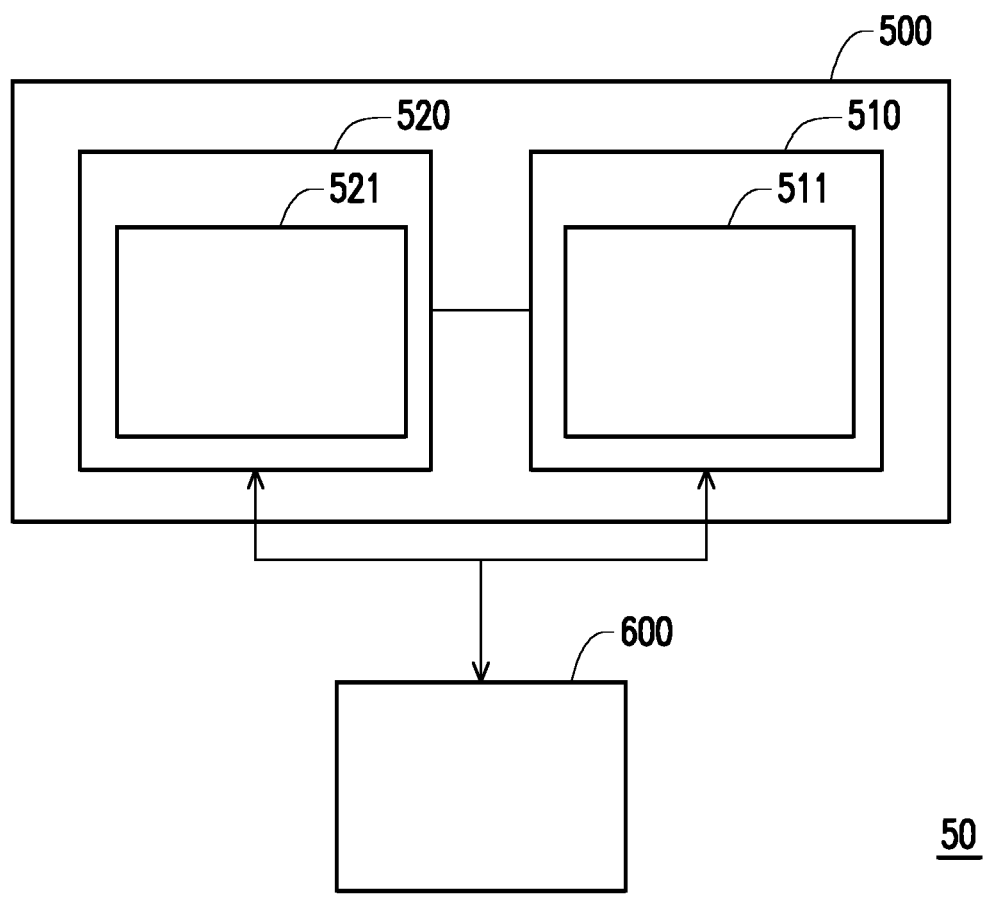
FIG. 4 is a schematic view of a spectrometer according to another embodiment of the present invention.

FIG. 4 is a schematic view of a spectrometer according to another embodiment of the present invention. Referring to FIG. 4, a spectrometer 50 includes an optomechanical module 500 and a control module 600. The optomechanical module 500 is coupled to the control module 600. The optomechanical module 500 includes an optomechanical engine 510 and a sampling device 520. The optomechanical engine 510 is coupled to the sampling device 520. In the present embodiment, the sampling device 520 includes a memory device 521, and the memory device 521 is disposed in the sampling device 520. The optomechanical engine 510 further includes another memory device 511, and the memory device 511 is disposed in the optomechanical engine 510. The another memory device 511 is configured to pre-store another optomechanical parameter corresponding to the optomechanical engine 510. The another optomechanical parameter may include, for example, at least one of a wavelength calibration parameter, an effective wavelength range parameter, an optomechanical control parameter, an optomechanical serial number parameter and an optomechanical operation time parameter. Compared with the embodiments in FIG. 1 and FIG. 2, the optomechanical module 500 of the present embodiment may include two memory devices 511, 521. The memory device 511 in the optomechanical engine 510 may store the optomechanical parameter, and the memory device 521 in the sampling device 520 may store a sampling device parameter, but the present invention is not limited to this. The memory device 511 may store part of the optomechanical parameter and sampling device parameter, and the memory device 521 may store another part of the optomechanical parameter and sampling device parameter. The control module 600 may obtain the optomechanical parameter and the sampling device parameter by reading the memory devices 511, 521 disposed in the optomechanical engine 510 and the sampling device 520, and may respectively calibrate the optomechanical engine 510 and the sampling device 520 according to the optomechanical parameter and the sampling device parameter. Therefore, the spectrometer 50 of the present embodiment may effectively calibrate the optomechanical engine 510 and the sampling device 520 according to the calibrate optomechanical parameter and sampling device parameter.

In addition, for other implementation features and technical details of the optomechanical engine 510 and the sampling device 520 of the optomechanical module 500 of the present embodiment, sufficient instructions, suggestions and implementation illustrations may be obtained with reference to the illustrations of the embodiments in FIG. 1 to FIG. 3. Therefore, the descriptions thereof are omitted herein.

Figure 5:
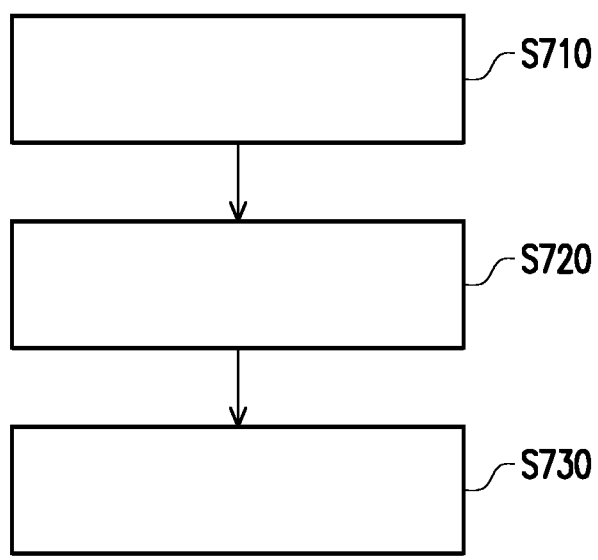
FIG. 5 is a flowchart of an operation method for a spectrometer according to another embodiment of the present invention.

FIG. 5 is a flowchart of an operation method for a spectrometer according to another embodiment of the present invention. The operation method for a spectrometer of the present embodiment may be at least applied to the spectrometers 20, 50 of the embodiments in FIG. 1 and FIG. 4. Referring to FIG. 1 and FIG. 5, in step S710, the spectrometer 20 may pre-store the optomechanical parameter corresponding to the optomechanical engine 210 in the memory device 221 in the sampling device 220. In step S720, the spectrometer 20 may read the memory device 221 by the control module 300 to obtain the optomechanical parameter. In step S730, the spectrometer 20 may calibrate the optomechanical engine 210 by the control module 300 according to the optomechanical parameter. Therefore, the spectrometer 20 of the present embodiment may effectively calibrate the optomechanical engine 210 according to the calibration optomechanical parameter. Moreover, for other implementation features and technical details of the spectrometer 20 of the present embodiment, sufficient instructions, suggestions and implementation illustrations may be obtained with reference to the illustrations of the embodiments in FIG. 1 to FIG. 4. Therefore, the descriptions thereof are omitted herein.

Based on the foregoing, according to the spectrometer, the optomechanical module and the operation method for a spectrometer in the present invention, an optomechanical parameter corresponding to an optomechanical engine and a sampling device parameter corresponding to a sampling device may be provided for a control module by means of a memory device disposed in the optomechanical engine or the sampling device, such that the control module can effectively and accurately calibrate the optomechanical engine and the sampling device. Therefore, the spectrometer of the present invention can effectively reduce the manufacturing cost of a manufacturer, and can provide a good material analysis application function.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A spectrometer, comprising an optomechanical module and a control module, the optomechanical module comprising an optomechanical engine and a sampling device, the optomechanical engine being disposed in the optomechanical module, the sampling device being disposed in the optomechanical module and coupled to the optomechanical engine, the sampling device being configured to transfer a sampling light to the optomechanical engine, the sampling device comprising a memory device, the memory device being disposed in the sampling device and configured to pre-store an optomechanical parameter corresponding to the optomechanical engine, the control module being coupled to the optomechanical module and configured to read the memory device to obtain the optomechanical parameter, and the control module calibrating the optomechanical engine according to the optomechanical parameter.

2. The spectrometer of claim 1, wherein the optomechanical parameter comprises at least one of a wavelength calibration parameter, an effective wavelength range parameter, an optomechanical control parameter, an optomechanical serial number parameter and an optomechanical operation time parameter.

3. The spectrometer of claim 1, wherein the control module correspondingly modifies the optomechanical parameter pre-stored in the memory device according to an operation result of the optomechanical module.

4. The spectrometer of claim 1, wherein the memory device comprises:
   a memory; and
   a control interface, coupled to the memory,
   the control module communicating with the control interface of the memory device in a wired or wireless manner, and reading, writing or modifying data stored in the memory through the control interface.

5. The spectrometer of claim 1, wherein the sampling device comprises at least one of a reflective sampling device, a transmissive sampling device and an optical fiber input sampling device.

6. The spectrometer of claim 1, wherein the memory device also pre-stores a sampling device parameter corresponding to the sampling device, and the control module reads the memory device to obtain the sampling device parameter, so as to calibrate the sampling device according to the sampling device parameter.

7. The spectrometer of claim 6, wherein the sampling device parameter comprises at least one of a sampling device type, a sampling device serial number, a light source operation time parameter, a signal processing parameter, a sampling device control parameter and a sampling device calibration parameter.

8. The spectrometer of claim 6, wherein the control module also correspondingly modifies the sampling device parameter pre-stored in the memory device according to an operation result of the optomechanical module.

9. The spectrometer of claim 1, wherein the optomechanical engine comprises:
   another memory device, disposed in the optomechanical engine, and configured to pre-store another optomechanical parameter corresponding to the optomechanical engine.

10. The spectrometer of claim 9, wherein the another optomechanical parameter comprises at least one of a wavelength calibration parameter, an effective wavelength range parameter, an optomechanical control parameter, an optomechanical serial number parameter and an optomechanical operation time parameter.

11. An optomechanical module, comprising an optomechanical engine and a sampling device,
   the optomechanical engine being disposed in the optomechanical module,
   the sampling device being disposed in the optomechanical module and coupled to the optomechanical engine, the sampling device being configured to transfer a sampling light to the optomechanical engine, the sampling device comprising a memory device,
   the memory device being disposed in the sampling device and configured to pre-store an optomechanical parameter corresponding to the optomechanical engine, the memory device comprising a memory and a control interface,
   the control interface being coupled to the memory, and
   the memory device communicating with an external control module in a wired or wireless manner through the control interface to provide the optomechanical parameter to the control module, such that the control module calibrates the optomechanical engine according to the optomechanical parameter.

12. The optomechanical module of claim 11, wherein the optomechanical parameter comprises at least one of a wavelength calibration parameter, an effective wavelength range parameter, an optomechanical control parameter, an optomechanical serial number parameter and an optomechanical operation time parameter.

13. The optomechanical module of claim 11, wherein the control module correspondingly modifies the optomechanical parameter pre-stored in the memory device according to an operation result of the optomechanical module.

14. The optomechanical module of claim 11, wherein the sampling device comprises at least one of a reflective sampling device, a transmissive sampling device and an optical fiber input sampling device.

15. The optomechanical module of claim 11, wherein the memory device also pre-stores a sampling device parameter corresponding to the sampling device, and the control module reads the memory device to obtain the sampling device parameter, so as to calibrate the sampling device according to the sampling device parameter.

16. The optomechanical module of claim 15, wherein the sampling device parameter comprises at least one of a sampling device type, a sampling device serial number, a light source operation time parameter, a signal processing parameter, a sampling device control parameter and a sampling device calibration parameter.

17. The optomechanical module of claim 15, wherein the control module also correspondingly modifies the sampling device parameter pre-stored in the memory device according to an operation result of the optomechanical module.

18. The optomechanical module of claim 11, wherein the optomechanical engine comprises:
   another memory device, disposed in the optomechanical engine, and configured to pre-store another optomechanical parameter corresponding to the optomechanical engine.

19. The optomechanical module of claim 18, wherein the another optomechanical parameter comprises at least one of a wavelength calibration parameter, an effective wavelength range parameter, an optomechanical control parameter, an optomechanical serial number parameter and an optomechanical operation time parameter.

20. An operation method for a spectrometer, applied to the spectrometer, the spectrometer comprising an optomechanical module and a control module, the optomechanical module comprising an optomechanical engine and a sampling device, the sampling device comprising a memory device, the method comprising:
   pre-storing an optomechanical parameter corresponding to the optomechanical engine in the memory device in the sampling device;
   reading the memory device by the control module to obtain the optomechanical parameter; and calibrating the optomechanical engine by the control module according to the optomechanical parameter.

* * * * *